(12) United States Patent
Siddiqui et al.

(10) Patent No.: US 8,774,385 B2
(45) Date of Patent: Jul. 8, 2014

(54) METHOD AND APPARATUS FOR RINGBACK TONE PERSONALIZATION

(75) Inventors: Aqeel Siddiqui, Plano, TX (US); Dipankar Ray, Plano, TX (US)

(73) Assignee: Ericsson Inc., Plano, TX (US)

( * ) Notice: Subject to any disclaimer, the term of this patent is extended or adjusted under 35 U.S.C. 154(b) by 1810 days.

(21) Appl. No.: 11/423,754

(22) Filed: Jun. 13, 2006

(65) Prior Publication Data
US 2007/0286401 A1    Dec. 13, 2007

(51) Int. Cl.
H04M 3/42    (2006.01)
H04W 4/16    (2009.01)

(52) U.S. Cl.
USPC ................................ 379/207.16; 455/414.1

(58) Field of Classification Search
USPC ........... 379/210.01, 88.19, 372, 88.25, 88.17, 379/207.16; 455/567, 414.1, 418
See application file for complete search history.

(56) References Cited

U.S. PATENT DOCUMENTS

| | | | |
|---|---|---|---|
| 7,512,421 B2 * | 3/2009 | Kim et al. | 455/567 |
| 7,664,236 B2 * | 2/2010 | Radziewicz et al. | 379/88.25 |
| 7,801,293 B2 * | 9/2010 | Batni et al. | 379/207.16 |
| 8,270,573 B2 * | 9/2012 | Fiorillo et al. | 379/35 |
| 2001/0051517 A1 * | 12/2001 | Strietzel | 455/414 |
| 2004/0001518 A1 | 1/2004 | Gilbert et al. | |
| 2004/0114732 A1 * | 6/2004 | Choe et al. | 379/88.17 |
| 2004/0120494 A1 * | 6/2004 | Jiang et al. | 379/210.01 |
| 2005/0163300 A1 * | 7/2005 | Kawakami et al. | 379/207.16 |
| 2006/0013377 A1 * | 1/2006 | Ahn et al. | 379/207.16 |
| 2006/0177044 A1 * | 8/2006 | O'Neil et al. | 379/373.02 |
| 2006/0210033 A1 * | 9/2006 | Grech et al. | 379/88.19 |
| 2007/0286402 A1 * | 12/2007 | Jacobson | 379/372 |

FOREIGN PATENT DOCUMENTS

| | | |
|---|---|---|
| CN | 1688151 A | 10/2005 |
| KR | 2004013330 | 2/2004 |
| WO | WO 2005/009015 A1 | 1/2005 |

OTHER PUBLICATIONS

CN Office Action issued Apr. 12, 2013 in re CN Application No. 200780021820.7.

* cited by examiner

*Primary Examiner* — Rasha Al Aubaidi

(74) *Attorney, Agent, or Firm* — Coats & Bennett, P.L.L.C.

(57) ABSTRACT

A service based Ringback Tone service that may be personalized by a calling party instead of a called party. The calling party generates and stores an originating profile that contains Ringback Tones or Ringback messages associated with a Ringback Tone subscriber (called party). When the calling party contacts the called party, the Ringback Tone chosen by the calling party and associated with the called party is then sent to the calling party until the calling party answers the call.

16 Claims, 4 Drawing Sheets

METHOD AND APPARATUS FOR RINGBACK TONE PERSONALIZATION

CROSS-REFERENCE TO RELATED APPLICATIONS

NOT APPLICABLE.

STATEMENT REGARDING FEDERALLY SPONSORED RESEARCH OR DEVELOPMENT

NOT APPLICABLE

REFERENCE TO SEQUENCE LISTING, A TABLE, OR A COMPUTER PROGRAM LISTING COMPACT DISC APPENDIX

NOT APPLICABLE

BACKGROUND OF THE INVENTION

The present invention relates to Ringback tones. More particularly, and not by way of limitation, the present invention is directed to a system and method for determining and assigning Ringback tones to specific calling parties.

Prior Art and Problems

A Ringback Tone is the sound heard by a calling party (CallER) on a telephone after connection is made to a called party and prior to the called party (CallED) answering the call. The standard Ringback tone in wireline and wireless systems is different in various countries. In the United States, the standard Ringback tone utilizes a combination of signals applied for a short period and then repeated. Most other countries use a single tone.

Use of unique Ringback Tones has gained popularity in the last few years. It has been very successful in Asia. In North America as well, most cellular operators are either already providing this service, or have plans to provide this service in future. A Ringback Tone has different designations with different operator such as Personal Greeting Service (Ericsson), Caller Tunes (T-Mobile), Answer Tones (Cingular), etc.

This Ringback tone service is commonly associated with the terminating (CallED) subscriber. When a CallER (initiating subscriber) calls a Ringback Tone subscriber, this service is invoked and a Ringback Tone, usually picked especially for the CallER, is played to the CallER (CallER and CallED will be used interchangeably with calling party and called party respectively, hereinafter). Before the CallED subscriber answers the call, a music, audio clip, joke, etc. (also called Ringback Tone) may be played back to the CallER. When the CallED subscriber answers the call, the Ringback Tone is stopped and the call is setup as a regular call. Ringback tones have become popular especially in the wireless, or cell phone, communications systems.

A form of Ringback Tones is "personalized" Ringback tones and callers typically hear a selection that has been previously determined by the CallED party. These selections can include music, messages, special sound effects, etc. Equipment is installed in a communications network that allows replacement and playing of a standard Ringback tone with a personalized selection. The application of the personalized audio selections is accomplished with a subscriber account that can be modified through WWW, WAP, IVR, or SMS user interfaces.

Prior solutions require providing originating service triggering in the network. This has significant impact on the network \and the required signaling. The current state of the art requires additional signaling and due to the additional signaling and complexity of the Ringback tone (RBT) production, a choice of Ringback tones is not used in most markets. When the Ringback tone service is used, the only available service gives the called party the choice of assigning Ringback tones to particular callers. Thus, it would be advantageous to have an arrangement and method for permitting a calling party to choose a Ringback tone in order to overcome the disadvantages of the prior art and provide additional revenue producing services. The present invention provides such an arrangement and method.

BRIEF SUMMARY OF THE INVENTION

When a CallED Ringback Tone subscriber receives a call, a profile database is checked to determine if the calling party (CallER) has an established profile in the called party's (CallED) network. If the calling party has a preference for a particular Ringback Tone for the called subscriber stored in the CallER party's profile, then that preference takes precedence over any Ringback Tone dictated by the called party.

The CallER preference is checked when the CallED user is a Ringback Tone subscriber of the operator where CallER personalization is provided. If the CallED user is not a Ringback Tone subscriber, then the CallER preference is not utilized, thus the CallER will hear standard ringing. This is true even in the case of a third party (not either subscriber's operator) Ringback Tone service provider (Since these checks are performed in the Service network, the arrangement can be characterized as a "service-based Ringback Tone personalization". The present invention has no network impacts. It can be implemented completely within the service elements without any additional signaling.

BRIEF DESCRIPTION OF THE DRAWINGS

The novel features believed characteristic of the invention are set forth in the appended claims. The invention itself however, as well as preferred modes of use, further objects and advantages thereof, will best be understood by reference to the following detailed description of illustrative embodiments when read in conjunction with the accompanying drawings, wherein:

DETAILED DESCRIPTION OF THE INVENTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances detailed descriptions of well-known devices, circuits, and methods are omitted so as not to obscure the description of the present invention with unnecessary detail.

Figure 1:
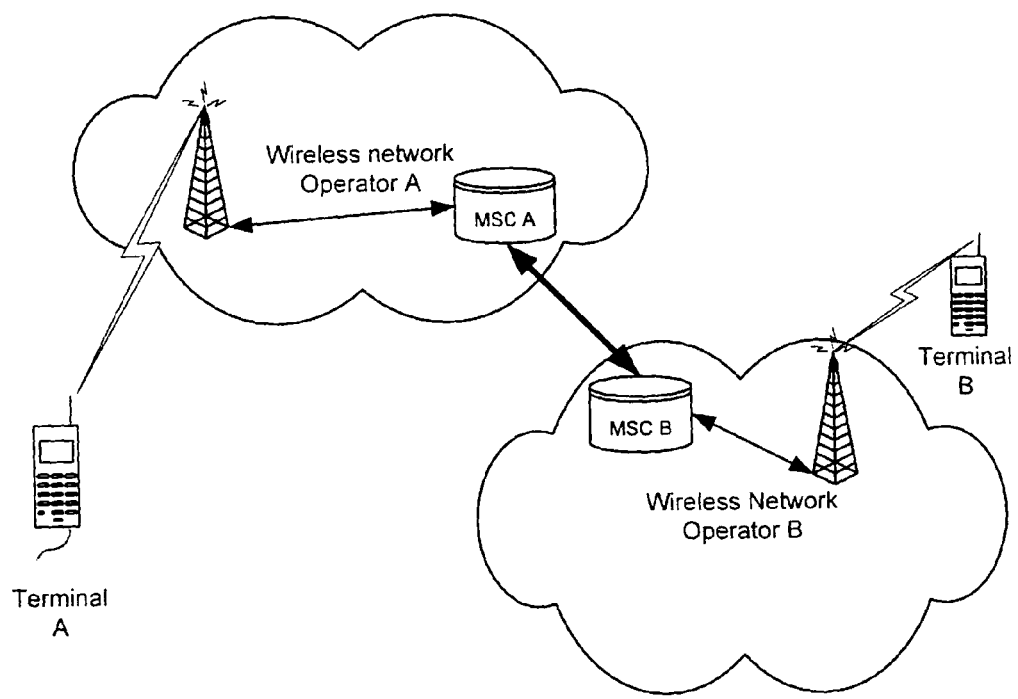
FIG. 1 depicts a high level block diagram of a call connection between a calling party terminal and a called party terminal.

FIG. 1 is a high level block diagram depicting a call connection between a calling party terminal and a called party terminal. The calling party terminal (A) is served by an originating telecommunications exchange switch (MSC A) and the called party terminal (B) is being served by a terminating telecommunications exchange. MSC A associated with the calling party terminal (A) collects a dialed number and originates a call setup signal such as an Integrated Service Digital Network User Part (ISUP) based Initial Address Message (IAM). MSC B associated with called party terminal (B) receives the IAM signal and extracts an enclosed directory number representing called party terminal (B).

Called party terminal (B) number is checked to determine whether the called party is a subscriber to a Ringback tone service (not shown). If not, a standard Ringback tone is generated and sent to calling party terminal (A). If the called party is a subscriber, a database containing calling numbers and associated Ringback tones is checked to see whether the called party has included the calling party number with an assigned Ringback tone. If there is a match, an associated Ringback tone is then generated and sent to calling party terminal (A) via the MSC A to MSC B connection since a call connection has already been established and is able to transport the generated tone to calling party terminal (A). If the called party is determined to be busy, the received incoming call connection is rejected or released and a busy signal is sent to originating MSC A. Originating MSC A generates a busy tone to calling party terminal (A) of the busy line status of called party terminal (B).

Figure 2:
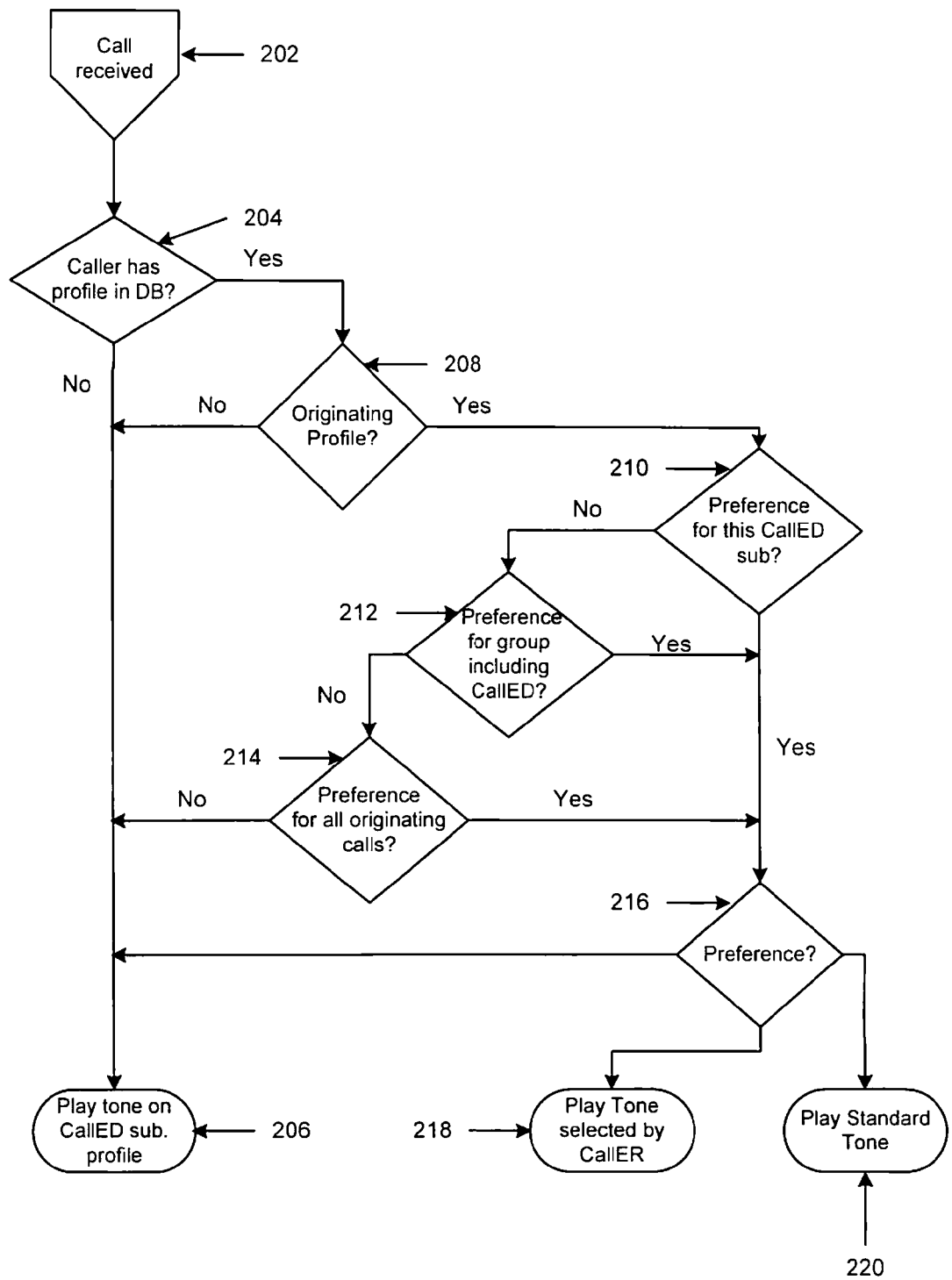
FIG. 2 illustrates a process for a calling party to assign specific Ringback tones to a called party in accordance with a preferred embodiment of the present invention.

FIG. 2 illustrates a process for a calling party to assign specific Ringback tones to a called party in accordance with a preferred embodiment of the present invention. A calling party (CallER) initially subscribes to the Ringback tone (RBT) service in the CallED party's network. An originating profile that includes the calling party subscriber's billing information and a list of the subscribers in the CallED network with associated Ringback tones is stored in the RBT service provider's system (this could be the operator or a third party provider). In this illustration, the calling party and the CallED party are subscribers to the RBT service. If the CallED party is not a Ringback Tone subscriber, the CallER would not be able to include the called party in an originating profile and the Ringback Tone heard by the CallER when a call is made would be the standard Ringback tone.

The process of generating a Ringback tone to a calling party starts with a CallED party receiving a call from a CallER (step 202). A check is made to determine whether the CallER has an originating profile in a profile database associated with the CallED party's system. If no CallER originating profile is found, assuming the CallED party is a subscriber to the RBT service, a tone based on the CallED party's preference is played to the CallER (step 206). If a profile of the CallER is found in the originating profile database, the process proceeds to step 208 and a determination is made as to whether the profile is an originating profile. If the CallER does have an originating profile, the originating profile is checked to see if there is a RBT preference associated with the CallED subscriber (step 210). If there is a preference, the process moves to step 216, which determines the preference stored by the CallER. At this point a Ringback Tone assigned to CallED subscriber in the CallER originating profile (step 218) or a standard tone (step 220) is played to the CallER.

If, on the other hand, there is no preference for a Ringback Tone in the profile for the CallED subscriber, the process then determines if the CallER has set a preference for a group that includes the CallED subscriber (step 212). If there is a group including the CallED subscriber, the process proceeds to step 216 to select the preference indicated in the originating profile (step 216). If the CallER does not have a preference for the group that includes the CallED subscriber, the process moves to step 214 to determine if the CallER has a preference stored that applies to any called party in the system to which the CallER originates a call. If so, the process then determines the preference (step 216) and selects the applicable Ringback Tone.

If the CallER does not indicate a particular Ringback Tone preference assigned to all calls originated by the CallER (step 214), the process then proceeds to step 206 where a tone specified by the CallED profile is then played to the CallER (step 206). If the CallER has indicated a preference for all calls originating from the CallER, the process proceeds to step 216 to determine the CallER's stored preference. The stored preference may be either a Ringback Tone based on a tone selected by the CallER (step 218), a standard tone (step 220) or a tone based on a choice by the CallED party (step 206).

Figure 3A:
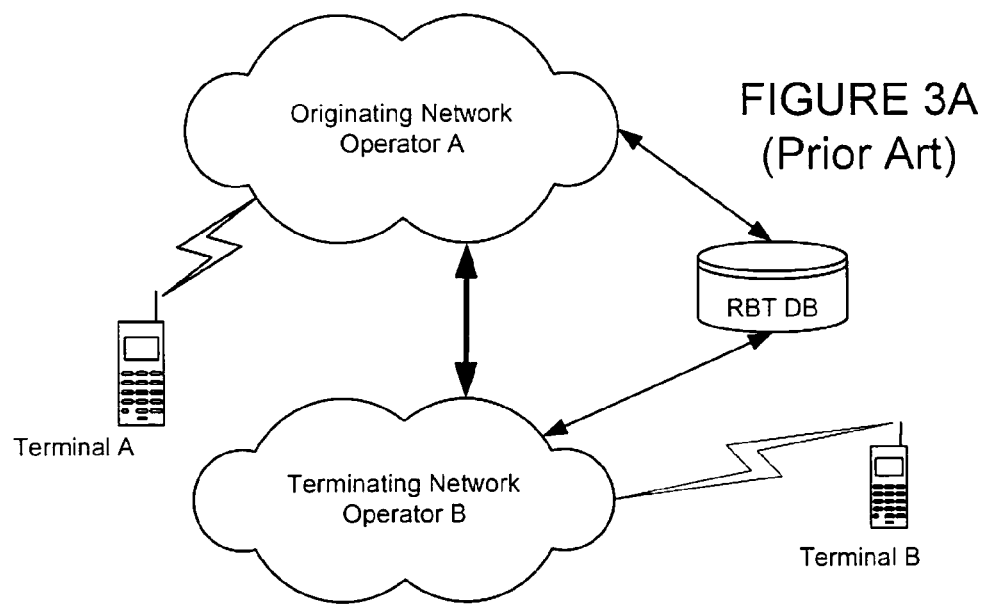
FIG. 3A illustrates a high level block diagram of the signaling in a Ringback tone system.

FIG. 3A illustrates a high level block diagram of the signaling in a Ringback tone system. When Terminal A, associated with the Originating network A, makes a call to Terminal B, the Ringback Tone service is contacted. If Terminal A has a pre-assigned Ringback Tone (assigned by Terminal B) in the database, this Ringback Tone is played to Terminal A. The signaling is also sent to Terminal B in Terminating network B. Typically, Terminal B (the called party) must be a subscriber to the Ringback Tone system and the calling party must also be a subscriber. When Terminal B picks up the phone, a voice connection is provided between Terminal A and Terminal B and the Ringback Tone system is disconnected.

Figure 3B:
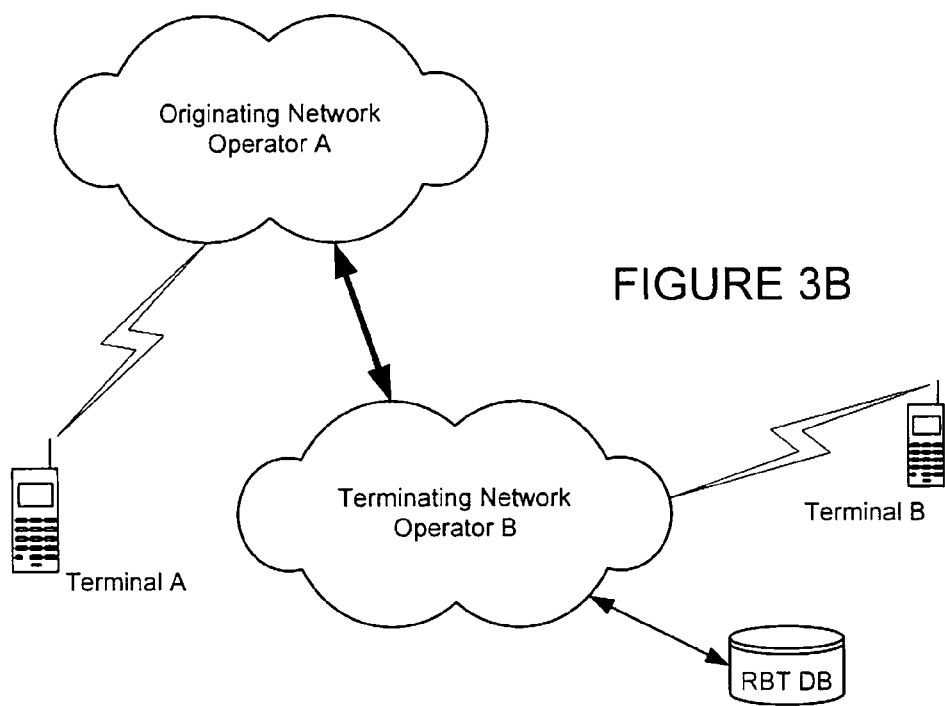
FIG. 3B depicts a high level block diagram of a preferred embodiment in accordance with the present invention.

FIG. 3B depicts a high level block diagram of a preferred embodiment in accordance with the present invention. If the RBT containing node is owned by a single operator, it is likely that only subscribers that are common to the operator will be able to participate. However, if there is a Ringback tone service provider that is providing the RBT service to multiple operators, then the subscribers of all these served operators will store their originating profiles with this common service provider.

Figure 4:
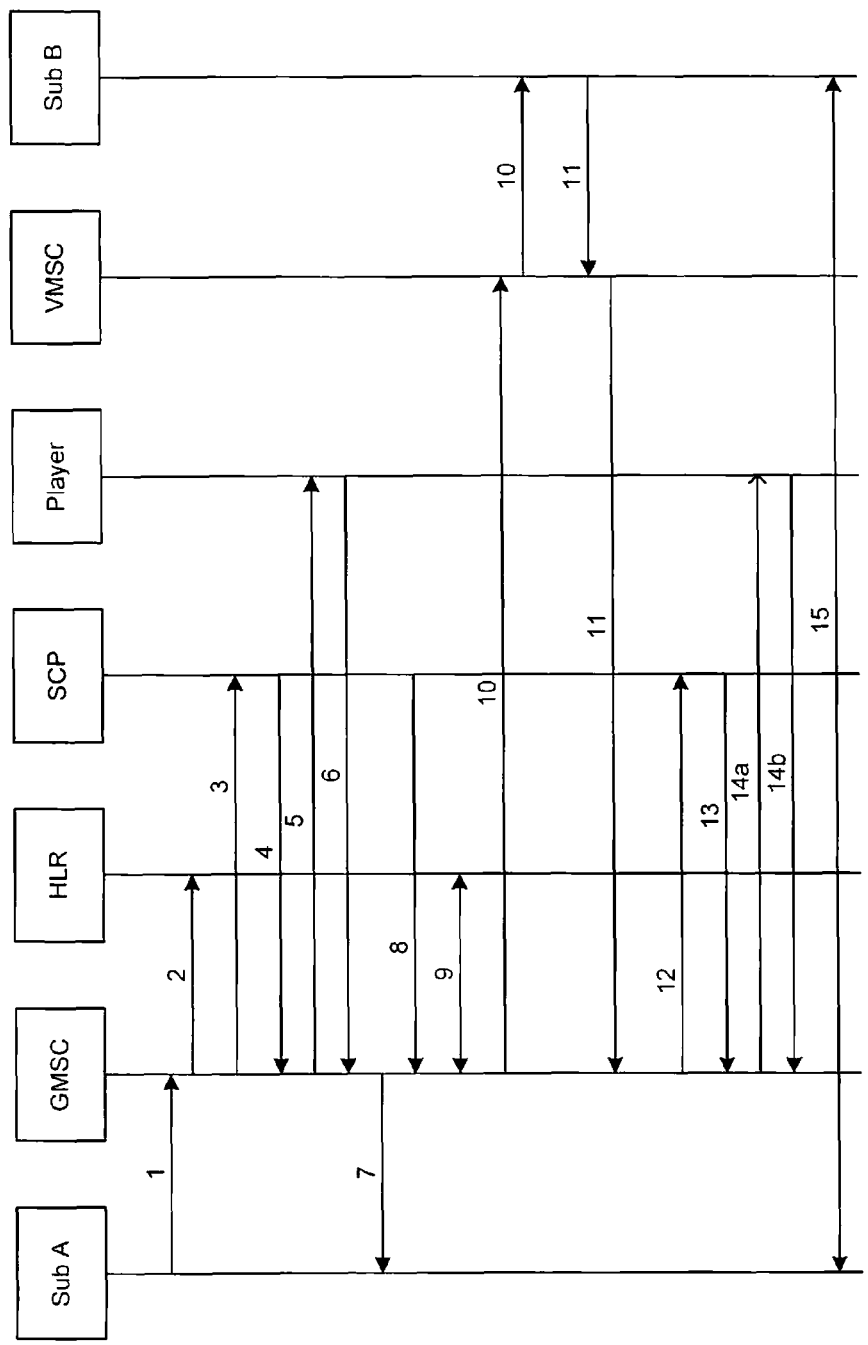
FIG. 4 depicts a signaling diagram in accordance with a preferred embodiment of the present invention.

FIG. 4 depicts a signaling flow diagram in accordance with a preferred embodiment of the present invention. The signaling begins with the caller generating a call (1). The call is routed to a Gateway Mobile Switching Center from the CallER to the CallED subscriber network which sends a query to the Home Location Register (2). A CAMEL trigger is sent at the same time to the Service Control Point (SCP) (3). The SCP sends appropriate instructions to the GMSC to connect a player containing the Ringback tones to the CallER. (4).

The RBT player requests and receives the CallER number (A number) and the CallED number (B number) (6) extracted by the SCP and sends the assigned CallED Ringback tone to the CallER (7). The SCP signals the GMSC to maintain the connection with the CallER (8) and the GMSC receives a response to the HLR query and contacts the V Mobile Switching Center (VMSC) through which the CallED subscriber is connected (10).

The CallED subscriber answers the call and the VMSC routes the signal to the GMSC (11). (The player continues to play the assigned Ringback tone to the CallER) The GMSC notifies the SCP that the CallED subscriber has answered the call (12) and the SCP sends a request to the GMSC to disconnect the Player (13). The GMSC disconnects the player and connects the CallED subscriber (13) to the CallER (15).

The present invention provides a means to increase operator revenues and does not impact the operator's network. One example may be, for a relatively small charge the Operator's subscribers can be given the option of creating an originating profile. Once the service is provided there will be no additional cost to the operator for allowing users to create the originating profile providing additional revenue at no additional operational cost.

This invention is applicable to IP Multimedia Subsystem (IMS) using open standard IP protocols as defined by the IETF wherein the RBT database interfaces with a SIP Application Server. In the case of a legacy network the RBT database will interface with Service Control Point (SCP). A personal greeting recorded by a called subscriber is played before the ringback tone. When the calling party selects its own content for a called subscriber, then the personal greeting of the called subscriber is not played, effectively screening the called party's Personal Greeting.

The present invention may be also be applied utilizing a third party. A provisioning interface over the IP network may be applied between the third party an the subscribing operators The interface between a subscriber and the third party can be via Web, WAP, IVR, or SMS It is important to note that while the present invention has been described in the context of a fully functional telecommunications system, those skilled in the art will appreciate that the Ringback tone functions described in the present invention are capable of being installed in and functioning through different nodes within a telecommunications operator's network. The present invention applies equally regardless of the location of the Ringback Tone data base and operating system.

While the present invention has been described with respect to various features, aspects, and embodiments, those skilled in the art will understand that various changes in form and detail may be made therein without departing from the spirit and scope of the invention.

What is claimed is:

1. A method for providing personalized Ringback tones, comprising the steps of:
    initiating a call from a calling party to a called party;
    determining whether the called party is a subscriber to a Ringback tone service;
    determining whether the calling party has an originating profile available to the called party Ringback tone service;
    checking for the calling party preference in the originating profile, wherein the originating profile includes a preferred Ringback tone associated with the called party; and
    playing the preferred Ringback tone to the calling party.

2. The method of claim 1, further comprising the steps of generating an originating profile for the calling party and storing preferred Ringback tones associated with respective called parties.

3. The method of claim 2, wherein the step of generating an originating profile includes creating and associating a specific Ringback tone to a specific group of called parties.

4. The method of claim 3, further comprising assigning the specific Ringback tone to all calls that originate from the calling party.

5. The method of claim 1, wherein the step of checking for a calling party preference further comprises choosing between a Ringback tone assigned to the called party by the calling party and a standard Ringback tone.

6. The method of claim 1, further comprising determining whether the calling party has a predetermined Ringback tone assigned to a group that includes the called party.

7. The method of claim 1, further comprising determining whether the calling party has a predetermined Ringback tone that is assigned to all of the calling party originating calls.

8. The method of claim 7, wherein the originating profile is stored and serviced by a third party system that is connected to and provides the Ringback tone service to, more than one telecommunications operator wherein the calling terminal is a subscriber to one of the more than one telecommunications operators.

9. An arrangement for providing personalized Ringback tones, comprising:
    call initiating means for initiating a call from a calling party to a called party; determination means for determining whether the called party is a subscriber to a Ringback tone service;
    determining means for determining whether the calling party has an originating profile available to the called party Ringback tone service;
    means for checking for a calling party preference in the originating profile, wherein the originating profile includes a preferred Ringback tone associated with the called party; and
    means for playing the preferred Ringback tone to the calling party.

10. The arrangement of claim 9, wherein the means for determining whether the called party is a Ringback tone subscriber further comprises the step of determining that the called party is not a Ringback tone subscriber and playing a standard system Ringback tone.

11. The arrangement of claim 9, further comprising determining whether the calling party has a stored Ringback tone preference assigned to a group that includes the called party.

12. The arrangement of claim 9, further comprising determining whether the calling party has a stored Ringback tone preference that is assigned to all the calling party originating calls.

13. The arrangement of claim 9, wherein the step of generating a calling party originating profile further comprises assigning a specific Ringback tone to a specific called party.

14. The arrangement of claim 13, further comprising assigning the specific Ringback tone to a specific group of called parties.

15. The method of claim 13, further comprising assigning the specific Ringback tone to all calls originating from the calling party.

16. The arrangement of claim 9, wherein the originating profile is stored and serviced by a third party system that is connected to and provides the Ringback tone service to more than one telecommunications operator, wherein the calling terminal is a subscriber to one of the more than one telecommunications operators.

* * * * *